July 26, 1949.                J. B. OLSON                2,477,138
                        PRESSURE POULTRY WATERER
                         Filed March 2, 1945
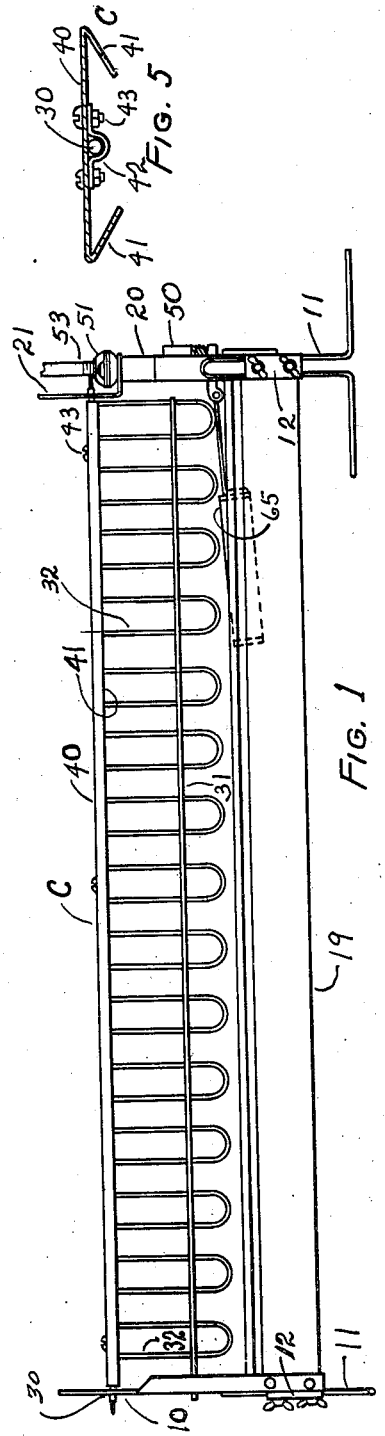
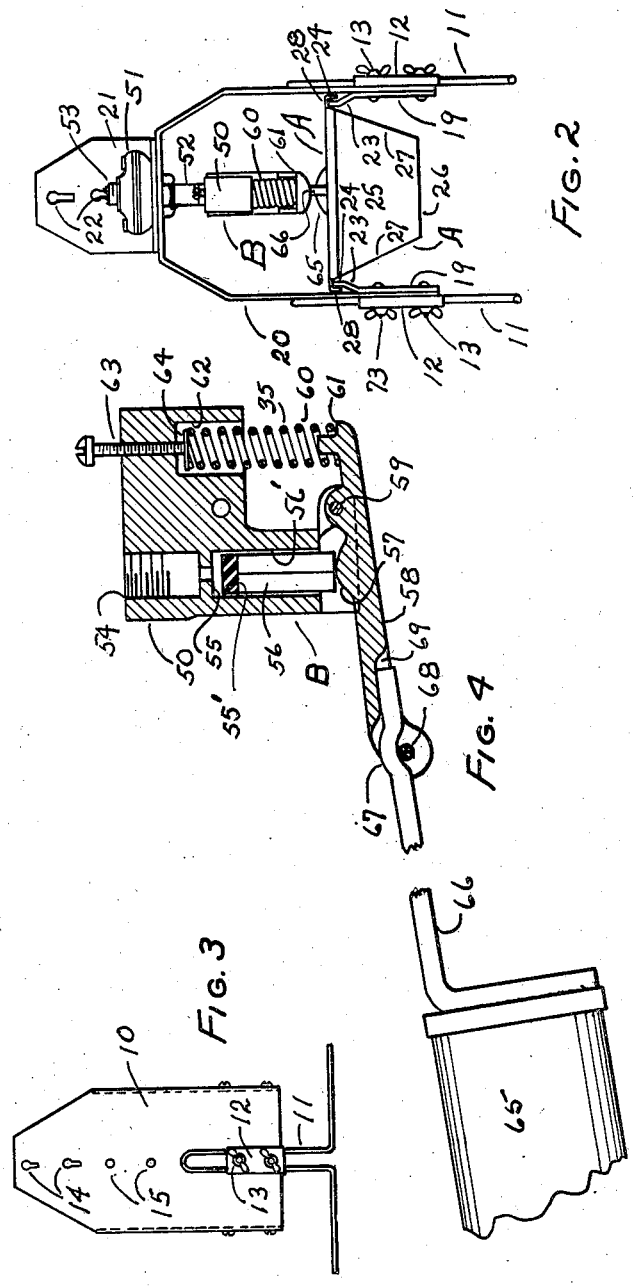
INVENTOR.
JOHN B. OLSON
BY
A. S. Krob
ATTORNEY Patented July 26, 1949

2,477,138

UNITED STATES PATENT OFFICE 2,477,138

PRESSURE POULTRY WATERER

John B. Olson, Fort Atkinson, Wis., assignor to James Manufacturing Company, Fort Atkinson, Wis., a company of Wisconsin Application March 2, 1945, Serial No. 580,514

2 Claims. (Cl. 119—80)

The present invention relates to an elongated self-feeding waterer for poultry having means whereby the water pan may be quickly and easily removed for cleaning purposes, the pan being narrow and easily handled for the purpose.

An important object of the present invention is to provide a float controlled valve which is closed by spring pressure and having a float which is easily detached from the valve so when the float is removed the valve is automatically closed.

An object of the present invention is to provide an elongated holding frame for the water pan having means whereby the pan may be removed drawer-like after the float has been removed from its connection to the valve, thus insuring the shutting off of the water supply before the pan is removed.

A still further object of the present invention is to provide a wire guard frame and position it longitudinally and concentrically above the pan leaving an equal and ample space on each side of the wire guard for the birds to get to the water without the necessity of putting their heads between wires.

A still further object of the present invention is to provide a narrow wire guard structure having two main frame wires, one above the other to which the guards are attached, the top wire having hingedly mounted thereon a narrow reel plate of a suitable width and design which is adapted to prevent the birds from roosting on the device.

Another object of the present invention is to provide an end frame member which is open so the water pan may be removed endwise drawer-like and to provide the end frame members with adjustable legs whereby the water pan may be held at a suitable height for the birds from an early age until they are full grown.

One of the objects of the present invention is to secure the end members together by means of vertically positioned plates, the upper edges of which are offset inwardly and supply the water pan with over-hanging edges, whereby the side plates may act as a suitable sliding support for the water pan.

To these and other useful ends my invention consists of parts, combination of parts or their equivalents and mode of operation as hereinafter described and claimed and shown in the accompanying drawings in which:

Fig. 1 is a side elevational view of my improved pressure waterer.

Fig. 2 is a valve end view of the device as shown in Figure 1.

Fig. 3 is the other end view of the device.

Fig. 4 is an enlarged sectional view of the valve showing a fraction of the float.

Figure 5 illustrates a means to prevent the birds from roosting on member C.

As thus illustrated the water pan in its entirety is designated by reference character A; the valve including the float in its entirety is designated by reference character B; the wire guard is designated in its entirety by reference character C.

The frame end opposite the valve comprises preferably a plate 10 having a supporting leg 11, made from a single piece of wire as illustrated and being adjustably secured to member 10 by means of a suitably shaped plate 12, and two thumb nut bolts 13, the upwardly extending portion of member 11 being partially surrounded by the edges of member 12 so when bolts 13 are made taut the device will be held firmly in its adjusted vertical position. Member 10 is shaped about as shown in Figure 3 having two or more key shaped openings 14 and two or more holes 15 which are spaced the same distance apart as openings 14 for a purpose which will hereinafter appear.

The frame of the valve end of the device comprises an inverted U-shaped member 20 made from flat strip metal having secured to its top an L-shaped plate 21 having therein two key shaped openings 22 (one not shown) which are shaped and spaced similar to openings 14.

On the lower ends of member 20 I secure two members 11 which are secured to member 20 similar to the fastening of member 11 to member 10, so the valve end of the device may be adjusted vertically and firmly held in its adjusted position similar to the other end.

Members 10 and 20 are secured together by means of side plates 19, as illustrated. An advantage of this design is that waterers of several lengths can be manufactured by simply supplying special troughs, side plates 19 and members C of corresponding length. Members 11 on the valve end are secured to members 20 by means of the same size bolts and pads which hold members 19 to member 10. The upper edges of members 19 are offset inwardly as at 23 providing a narrow vertical strip 24.

The water pan of my device comprises end members 25, bottom member 26 and diverging side walls 27—27, the upper edges of which extend outwardly and then downwardly as at 28 forming a suitable slide rest for the ater pan on members 24.

My improved wire guard comprises an upper frame wire 30 and a lower frame wire 31. Wire 30 is flattened transversely at its ends, opening 22 being large enough for the flattened end to extend therethrough, the key of this opening being wide enough for the free reception of wire 30, therefore the flattened ends of wire 30 will prevent leaving the opening unless the lattice is raised, to attach lattice member C, 21 is first loosened, the upper and lower wires are then inserted in two of the openings in member 10 after which the other end of wire 30 is positioned in bracket 21 and the bracket again secured to member 20 thus to position member C longitudinally. Member 31 is spaced from member 30 so its end will fit into one of the openings 15 in member 10; thus member C may be adjusted vertically, and the end of member 31 fitting into opening 15, will prevent member C from swinging out of position. Members 30 and 31 are secured together by a number of equally spaced U-shaped loops 32 as illustrated in Figure 1, these loops being secured to members 30 and 31 preferably by electric welding.

Thus it will be seen that there is a clear opening on opposite sides of member C so the birds can easily drink from the water pan, but can not interfere with the birds on the other side of the device. Birds, especially turkeys, do not like to place their heads between wires for drinking and eating for in doing so they frequently injure their combs or wattles. Applicant's device is particularly desirable for reasons given.

I provide means for preventing the birds from roosting on the wire guard as follows:

A plate 40 having downwardly and inwardly extending flanges 41—41 is hingedly secured to member 30 by means of clips 42 and bolts 43. Thus member 40 is free to turn on member 30 as far as members 41 will permit. The object of members 41 and their shape is to add strength to the edges of member 40 and form a stop for this member so as not to interfere with the birds while drinking.

My improved float control valve comprises a main body 50 which is preferably secured to a head 51 by means of a short pipe nipple 52. Member 51 is adapted to be secured to the flange of member 21 as illustrated in Figures 1 and 2 and is supplied with an inlet pipe connection 53 from the water source. Head 51 may be supplied with a pressure regulating device or a screen. Member 52 is screw-threaded into member 50 as at 54. A valve seat 55 is provided. Valve stem 56 is preferably square with slightly rounded corners and is adapted to fit freely in opening 56'. I provide preferably a rubber disc 55' which lies between the upper end of member 56 and seat 55, so when the water level reaches normal, disc 55' will be caused to rest on seat 55 and shut off the water supply. The lower end of valve stem 56 rests on a projection 57 on lever 58 and the lever being hingedly mounted on member 50 as at 59. A spring 60 rests on the end of member 58 as at 61 and extends upwardly into an opening 62 of member 50. I provide an adjusting screw 63 having a washer 64 at its end for contact with spring 60; thus the pressure at 61 may be adjusted by turning 63 one way or the other.

I provide a float 65 having an arm 66, the free end being shaped as shown in figure 4 with a sharp offset 67 adapted to lay on pin 68, the free end of member 66 resting in a groove 69; thus float 65 will counteract the pressure of spring 60 when the water level in pan A is below normal and when the water level is above normal, float 65 will permit spring 60 to close the valve and shut off the water supply.

By scrutinizing Figures 1 and 2 it will be seen that float 65 may be removed by lifting it far enough so the end of member 66 will be out of groove 69 and that after the float is removed from lever 58, water pan A may be removed drawer-like for cleaning and disinfecting and that when water pan A and the float are replaced into position the valve will be opened by the float and held open until the water level reaches normal at which time spring 60 will cause the valve to close. Thus valve B will be automatic in its action and be closed automatically when the float is removed for the purpose of removing pan A.

Having thus shown and described my invention I claim:

1. A pressure waterer of the character described comprising, end members and side plates secured to the bottoms thereof forming a frame, one of said end members being made from a flat strip of metal and having an inverted U shape, the other end member being made from sheet metal, the upper edges of the side plates being offset inwardly, a water trough, the upper side edges of which extend outwardly and downwardly and being adapted to slidably rest on and loosely embrace the offset edges of said side plates, a water supply valve secured to the upper end of said inverted U-shaped member, a lever hinged to the bottom of said water supply valve, a plunger valve resting on said lever adjacent said hinge, a push spring resting on the outer end of said lever, a quick detachable float secured to the inner end of said lever and adapted to overcome the pressure of said spring and open said valve when the water level is below normal, said spring adapted to close said valve when said float is detached, a vertical adjustable supporting leg secured to said sheet metal end member, vertically adjustable legs secured to the ends of said inverted U-shaped member, whereby said trough may be removed drawer-like after the float is detached.

2. A device as recited in claim 1 including, a sheet metal L-shaped bracket with its bottom flange extending outwardly and being releasably secured to the top of the inverted U-shaped member, the other end member having its top on substantially the same horizontal plane as the top of said bracket, spaced vertically positioned openings in the tops of said bracket and other end member, a lattice work formed by vertically spaced wires and a multiplicity of closely spaced U-shaped wires secured thereto, the ends of said upper lattice wire adapted to optionally extend through corresponding bracket and other end member openings, the lower lattice wire adapted to extend through an opening in the other end member whereby said lattice may be optionally vertically positioned to separate the birds on opposite sides of the trough and the lattice prevented from swinging sidewise on its upper wire.

JOHN B. OLSON.

REFERENCES CITED

The following references are of record in the file of this patent:

UNITED STATES PATENTS

| Number | Name | Date |
|---|---|---|
| 667,789 | McGuire | Feb. 12, 1901 |
| 801,324 | Lichtfeldt | Oct. 10, 1905 |
| 1,138,365 | Enos | May 4, 1915 |
| 1,208,967 | Hotchkiss | Dec. 19, 1916 |
| 1,260,713 | Rood | Mar. 26, 1918 |
| 1,452,325 | Ternes | Apr. 17, 1923 |
| 1,786,024 | Olson | Dec. 23, 1930 |
| 1,816,781 | Johnston | July 28, 1931 |
| 1,825,504 | Carr | Sept. 29, 1931 |
| 1,851,682 | Oakes | Mar. 29, 1932 |
| 1,916,790 | Guenser | July 4, 1933 |
| 2,011,684 | Martin | Aug. 20, 1935 |